United States Patent
Gronberg

[11] 3,745,754
[45] July 17, 1973

[54] AGRICULTURAL MACHINE

[76] Inventor: Sven Jorgen Gerhard Gronberg, Ottum L 6, 530 20, Kvanum, Sweden

[22] Filed: Feb. 9, 1972

[21] Appl. No.: 224,679

[52] U.S. Cl. ........................ 56/14.4, 56/364, 111/3
[51] Int. Cl. ............................................ A01d 43/12
[58] Field of Search .................. 56/13.5, 14.3, 14.4, 56/364, 500, 502, 504; 111/1–3

[56] References Cited
UNITED STATES PATENTS

| | | | |
|---|---|---|---|
| 3,294,046 | 12/1966 | Boots | 111/3 |
| 2,712,211 | 7/1955 | Smith et al. | 56/14.4 X |
| 2,631,418 | 3/1953 | Ronning | 56/14.3 X |
| 1,987,371 | 1/1935 | Rudd | 56/502 |

Primary Examiner—Louis G. Mancene
Assistant Examiner—J. N. Eskovitz
Attorney—John C. Holman et al.

[57] ABSTRACT

A machine for the treatment of straw distributed over the ground by a harvesting machine in which a first component includes a catching means and a rotary cutter, and a second component includes a soil cultivating means, with a conduit transferring the broken-up straw from the first component and terminating in distribution branches adjacent to the parts of the cultivating means entering into the soil.

3 Claims, 2 Drawing Figures

AGRICULTURAL MACHINE

BACKGROUND OF THE INVENTION

The present invention relates to an agricultural machine designed to make possible the hiding of straw distributed by a harvesting machine.

PRIOR ART

The straw returned to the ground by a harvesting machine must be destroyed in some way, either by being burned or by being plowed down into the soil. The latter method is difficult, as the straw often is spread in an unsatisfactory manner. Many harvesting machines are provided with some kind of cutter apparatus, which breaks up the straw, and spreads it over the ground. Such a cutter is a complication of the harvesting machine, and will increase the weight thereof. Other types of harvesting machines are provided with means to deliver the straw in a windrow on the ground, without breaking-up the straw.

SUMMARY OF THE INVENTION

The present machine comprises a first component including a straw gathering means and a cutter mounted in spaced relation thereto as well as a second component including soil cultivating means, and a conduit connecting the two components to transfer the broken-up straw from the cutter of the first component to the second component and to distribute it therein directly over the parts of the soil cultivating means entering into the ground.

The second component may be designed as a plow or as a harrow or any suitable type of soil cultivating means having parts entering into the ground.

DESCRIPTION OF A PREFERRED EMBODIMENT

Figure 1:
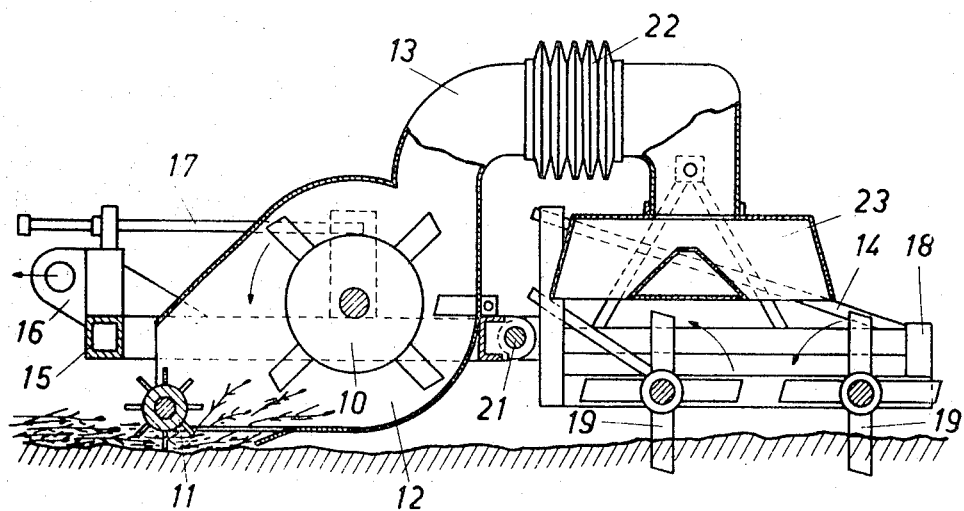
FIG. 1 shows, partly in section, an elevation of the machine.
Figure 2:
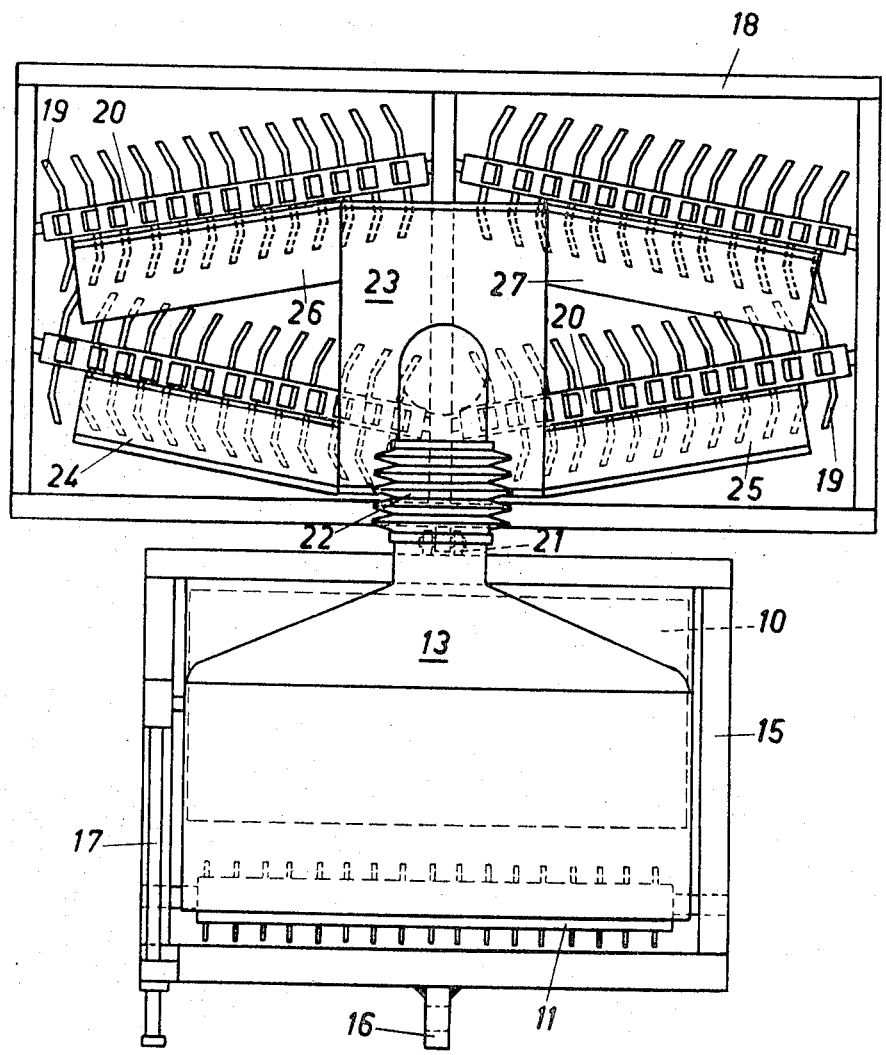
FIG. 2 shows the machine as viewed from above.

The machine comprises a first component including a rotary cutter 10 and a catching means 11 mounted in front thereof. This means will collect the straw from the ground, and it is evident that a machine of this type is best suited to work behind a harvesting machine of the type returning the straw in a windrow. The straw is transferred into the housing 12 of the cutter, and is broken-up into short lengths. The cutter is designed in such a manner that it simultaneously will act as a fan for transferring the broken-up straw by way of a conduit 13 to the second component of the machine, generally denoted by 14.

The first component is mounted on a frame 15, which is provided with means 16 for connection to a tractor, as well as with a shaft 17 designed to transfer rotary movement to the cutter and which also is connected to the tractor.

The soil cultivating component is here shown as a harrow of known type, which includes a frame 18 carrying a number of cruciform teeth 19, formed into four roller shaped groups 20, which are arranged in pairs and at an angle to each other. The frame 18 is connected to frame 15 by means of a pivot 21. The conduit 13 between the two components includes an elastic member 22, which guarantees that the conduit will operate independently of any possible angular displacement between the two main components.

An important feature of the invention is that the conduit above the harrow is terminated by a distributing box 23, which is designed in such a manner that branches 24, 25, 26 and 27 thereof will extend over the roller shaped groups of teeth 19 of the harrow and direct the broken-up straw to those of the teeth only entering into the soil. In this manner the straw in a very efficient manner will immediately be taken care of by the soil cultivating component and will be worked down into the soil and has no possibility to be blown out over the ground, due to the blast from the cutter.

When a multishare plow is used instead of the harrow the branches from the distributing box 23 will be formed in such a manner that the straw is delivered directly over the plow shares.

What I claim is:

1. In an agricultural machine of the type intended for the treatment of straw distributed over the ground by a harvesting machine, a first component including means for gathering straw and a rotary cutter mounted in spaced relationship thereto, a second component including means for cultivating the ground while simultaneously returning broken-up straw into the ground, means interconnecting the first and second components, and conduit means extending from the rotary cutter to the second component for transporting broken-up straw therebetween and terminating in distributing branches directed towards the parts of the soil cultivating means entering into the ground.

2. The argicultural machine according to claim 1 in which the cutter is operable as a fan for transporting the broken-up straw to the second component.

3. The agricultural machine according to claim 1 in which the conduit means includes an elastic member, and the interconnecting means hingedly couples the first and second components.

* * * * *